(12) United States Patent
Metzger

(10) Patent No.: US 8,555,482 B2
(45) Date of Patent: Oct. 15, 2013

(54) PROCESS OF ASSEMBLING A PROBE

(75) Inventor: Ronald A. Metzger, Waynesville, OH (US)

(73) Assignee: YSI Incorporated, Yellow Springs, OH (US)

( * ) Notice: Subject to any disclaimer, the term of this patent is extended or adjusted under 35 U.S.C. 154(b) by 401 days.

(21) Appl. No.: 12/773,995

(22) Filed: May 5, 2010

(65) Prior Publication Data
US 2011/0271518 A1    Nov. 10, 2011

(51) Int. Cl.
*G01R 31/28* (2006.01)

(52) U.S. Cl.
USPC ............... 29/593; 29/592.1; 29/825; 29/840; 324/67; 324/326

(58) Field of Classification Search
USPC ........... 29/592.1, 593, 825, 832, 840; 324/67, 324/326
See application file for complete search history.

(56) References Cited

U.S. PATENT DOCUMENTS

| | | | |
|---|---|---|---|
| 5,033,297 A | | 7/1991 | Gustafson |
| 5,133,606 A * | | 7/1992 | Zaragoza et al. ............ 374/208 |
| 5,147,524 A | | 9/1992 | Broadley |
| 5,821,405 A | | 10/1998 | Dickey et al. |
| 6,068,399 A * | | 5/2000 | Tseng ............................ 374/163 |
| 6,305,944 B1 | | 10/2001 | Henry et al. |
| 6,379,039 B1 * | | 4/2002 | Tseng ............................ 374/163 |
| 6,405,581 B1 | | 6/2002 | Bruhn |
| 6,423,197 B1 | | 7/2002 | Lenferink et al. |
| 6,677,861 B1 | | 1/2004 | Henry et al. |
| 6,779,383 B2 | | 8/2004 | Lizotte et al. |
| 6,798,347 B2 | | 9/2004 | Henry et al. |
| 6,928,864 B1 | | 8/2005 | Henry et al. |
| 6,938,506 B2 | | 9/2005 | Henry et al. |
| 7,007,541 B2 | | 3/2006 | Henry et al. |
| 7,138,926 B2 | | 11/2006 | Henry et al. |
| 7,221,136 B2 * | | 5/2007 | Olsson et al. .................. 324/67 |
| 7,298,126 B1 * | | 11/2007 | Olsson et al. .................. 324/67 |
| 7,832,295 B2 | | 11/2010 | Rodriguez et al. |
| 2007/0139039 A1 | | 6/2007 | Steinick |

FOREIGN PATENT DOCUMENTS

| | | |
|---|---|---|
| DE | 2416939 | 10/1975 |
| WO | 2006/047899 | 5/2006 |
| WO | 2009/111090 | 9/2009 |

OTHER PUBLICATIONS

PCT, International Search Report and Written Opinion, International Application No. PCT/US2011/032946 (Jan. 9, 2012).

* cited by examiner

*Primary Examiner* — Carl Arbes
(74) *Attorney, Agent, or Firm* — Thompson Hine L.L.P.

(57) ABSTRACT

A process of assembling a probe that includes providing a circuit board that is connectable to a sensor and is connected to a first electrical connector and sliding a housing that has a first end and a second end over the circuit board. The process includes sealingly connecting the first end of the housing and the first electrical connector with a water-tight seal and sealing the second end of the housing with a water-tight seal. Also disclosed is a probe made by the disclosed processes and a sonde including a probe made by the disclosed processes.

24 Claims, 6 Drawing Sheets

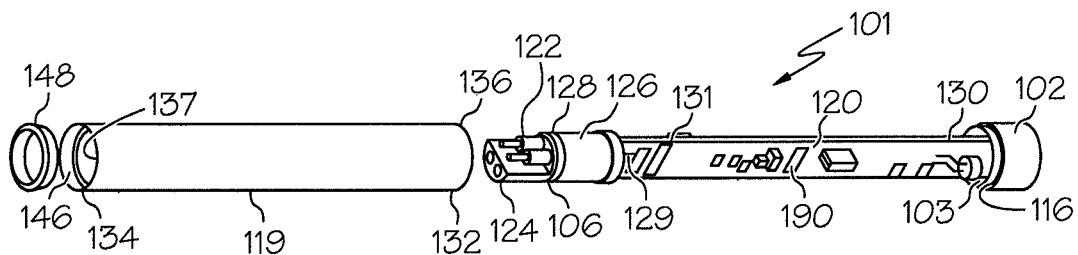
FIG. 1
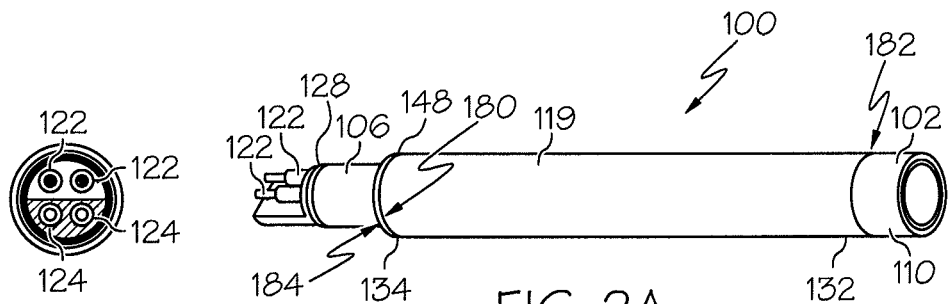
FIG. 2B
FIG. 2A
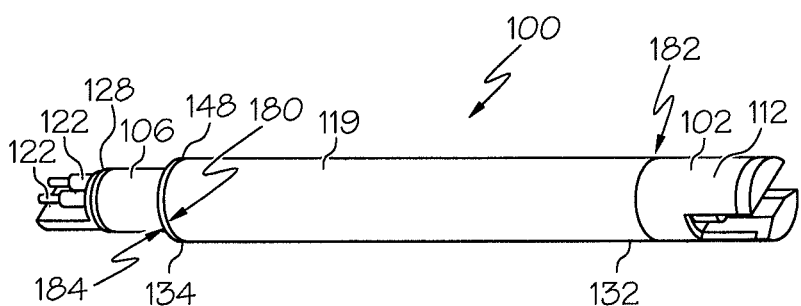
FIG. 3
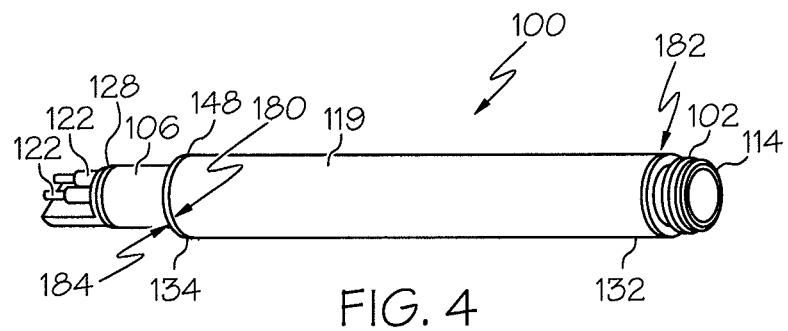
FIG. 4

PROCESS OF ASSEMBLING A PROBE

TECHNICAL FIELD

The present application relates to a probe and a process of assembling the probe.

BACKGROUND

Probes having sensors are known, in particular probes that are connectable to a water quality monitoring instrument, for example a sonde such as the sondes disclosed in U.S. Pat. Nos. 6,779,383 to Lizotte et al., 5,821,405 to Dickey et al., 5,235,526 to Saffell, 6,677,861, 6,798,347, 6,928,864, 6,938,506, 7,007,541, and 7,138,926 to Henry et al., to monitor parameters of the environment surrounding the instrument.

Applicants' probes are "smart probes" in that the body of the probe houses a circuit board with a plurality of components. The circuit boards are one of the most expensive components of the probe and it is critical to be able to assemble the probe without damaging the circuit board. It is also critical to be able to assemble the probe into a water-tight housing, since the probes are often used underwater. Applicants have developed a novel process of assembling the probe that addresses both of these critical issues, and, furthermore, advantageously allows the circuit board to be operational before assembly in the water-tight housing, such that the board may be programmed and/or the functionality of the board and/or sensor may be tested and/or calibrated before final assembly.

SUMMARY

One aspect of the invention is a process of assembling a probe that includes providing a circuit board that is connectable to a sensor and is connected to a first electrical connector and sliding a housing that has a first end and a second end over the circuit board. The process includes sealingly connecting the first end of the housing and the first electrical connector with a water-tight seal and sealing the second end of the housing with a water-tight seal. The step of sealingly connecting the first end of the housing to the first electrical connector preferably includes laser welding them together.

In one embodiment, the first electrical connector is a wet-mateable connector for connecting the circuit board to a monitoring device. The first electrical connector may include a casing about a portion thereof, preferably the end nearest the circuit board. With the casing present, the laser welding of the first end of the housing and the first electrical connector includes laser welding the housing to the casing.

In another embodiment, the housing further includes a reducing ring laser welded to the open second end. With the reducing ring present, the laser welding of the open second end of the housing includes laser welding the reducing ring to the casing.

In another embodiment, the circuit board is operable to operate the sensor before the housing is slid over the circuit board. Since the circuit board assembly is operable, the process may include testing the circuit board assembly to determine that the sensor is functioning and/or calibrating the sensor. These testing and/or calibrating steps may be performed prior to sliding the housing over the circuit board assembly.

In one aspect, the process includes the sensor housed within a probe head that is connected to the circuit board. With the probe head connected to the circuit board, the step of sealing the second end includes sealingly connecting the second end of the housing and the probe head together, which is preferably accomplished by laser welding the two components together.

In one embodiment, the probe head includes a neck defining a seat for the second end of the housing.

Another aspect of the invention is a process of assembling a probe body for a probe having a replaceable probe head. This process includes the same basic steps but the probe head housing the sensor is connectable to the circuit board and the step of sealing the second end includes sealingly connecting a second electrical connector that is connected to the circuit board to the housing to provide a water-tight seal. The second electrical connector is connectable to the sensor within the probe head and may be sealingly connected to the housing by applying a sealant between the second electrical connector and the housing.

Another aspect of the invention is a probe made by any of the disclosed processes disclosed.

Another aspect of the invention is a sonde including a probe made by any of the disclosed processes.

BRIEF DESCRIPTION OF THE DRAWINGS

FIG. 1 is a front, exploded perspective view of the components of one embodiment of a probe to be assembled by the novel process.

FIG. 2A is a side perspective view of an assembled probe having a turbidity head.

FIG. 2B is an end view of the connector of the turbidity probe of FIG. 2A.

FIG. 3 is a side perspective view of an assembled probe having a conductivity head.

FIG. 4 is a side perspective view of an assembled probe having a dissolved oxygen head.

DETAILED DESCRIPTION

Figure 5:
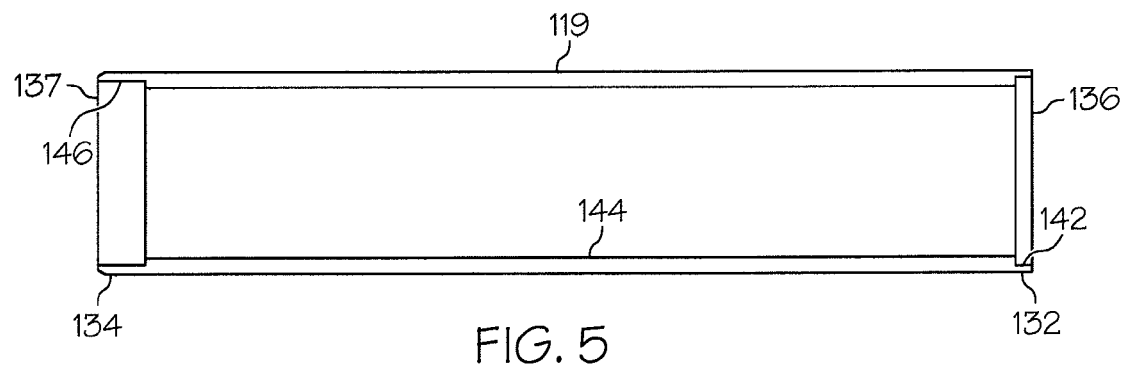
FIG. 5 is a cross-sectional view of the housing of FIG. 1.

The following detailed description will illustrate the general principles of the invention, examples of which are additionally illustrated in the accompanying drawings. In the drawings, like reference numbers indicate identical or functionally similar elements.

Referring to FIG. 1, the components of a probe, generally designated 101, are shown in an exploded, partially assembled configuration. The components of the probe include a probe head 102, a circuit board 120 having a first end 130 and a second end 131, a electrical connector 106, a housing 119 having a distal end 132 and a proximal end 134, and a reducing ring or welding ring 148.

The probe head 102 contains a sensor that has access to the environment surrounding the probe head to monitor at least one parameter of that environment. The sensor may include a plurality of components selected from an electrode, window, membrane, or other surface and/or combination thereof positioned in or protruding from the probe head 102. The probe head 102 defines a housing for the sensor and includes a neck 103 adjacent the first end 130 of the circuit board 120 (see FIG. 6 for an example). The neck 103 has a smaller outer diameter than the rest of the probe head 102 and defines an annular seat 116 where the neck transitions to the rest of the probe head 102. The probe head 102 may also include one or more leads extending from the neck 103 for connection to the circuit board 120. The leads may be soldered directly to the circuit board 120 or may plug into a component on the circuit board 120, such as a female header, a card edge connector, a printed circuit board connector, a USB connector, or any other known or later-developed connector.

The probe head 102, in particular the housing it defines, may be a metal and/or an anti-biofouling material. The metal may be water resistant and corrosive resistant. Suitable materials include titanium, stainless steel, nickel, copper, graphite, and alloys thereof. In one embodiment, the probe head is titanium. In another embodiment, the probe head is an anti-fouling copper-nickle alloy with a high copper content. For example, the antifouling copper-nickle alloy may be a 90-10 CuNi alloy or a 70-30 CuNi alloy. In another embodiment, the housing may be an antifouling plastic, for example, a polyethylene, polypropylene, or nylon that may include an antifouling compound such as capsaicin, capsicum, furan compounds, copper compounds, lactones, alkyl-phenols, organotin compounds, antibiotics, or mixtures thereof.

In the embodiments of FIGS. 2A-4, the probe head 102 is a turbidity head 110 (FIG. 2A), a conductivity or combination conductivity/temperature head 112 (FIG. 3), or a dissolved oxygen head 114 (FIG. 4), more preferably an optical dissolved oxygen head. The probe head 102, however, is not limited to these types of sensors. In another embodiment, the probe head 102 may include an electrode such as an ion-selective electrode. Any suitable ion-selective electrode or a plurality of ion-selective electrodes may be housed by the probe head 102, for example, a pH electrode, oxidation-reduction potential electrode, a dissolved oxygen electrode, an electrode selective toward nitrite ions, nitrate ions, ammonia, fluoride ions, sodium ions, chloride ions, potassium ions, calcium ions, bromide ions, or manganese(II) ions, or combinations of these electrodes. Each of these probe heads 102 have a neck 103 for seating the housing 119 thereon.

Figure 6:
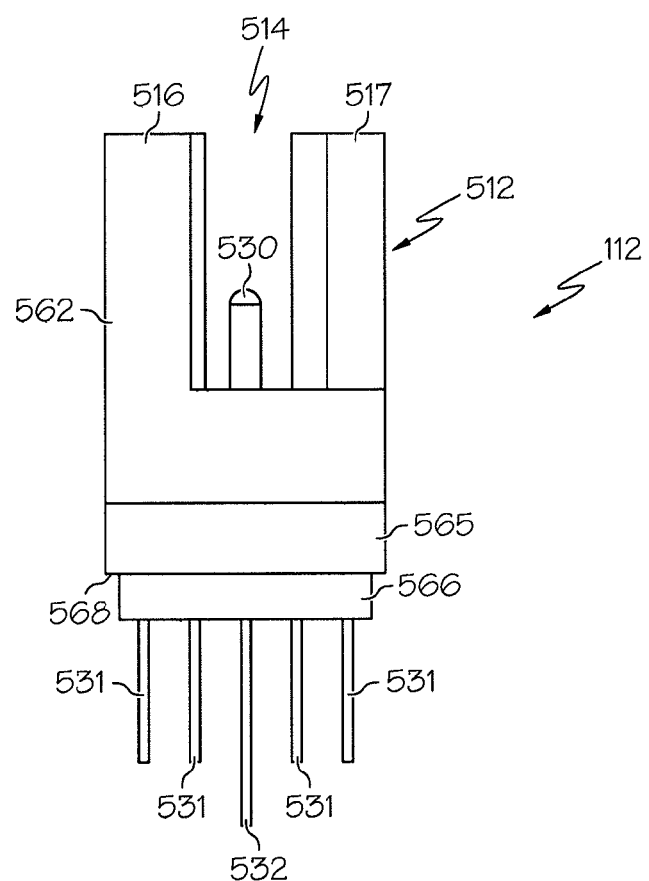
FIG. 6 is a front view of the conductivity head of FIG. 3.

Now referring to FIG. 6, the conductivity head 112 is preferably a forked electrode support 512 having a set of concentric electrodes in each arm 516, 517 similar to the conductivity head described in detail in Applicants' U.S. patent application Ser. No. 12/814,520 WIPEABLE CONDUCTIVITY PROBE AND METHOD OF MAKING SAME, filed Jun. 14, 2010, the entire contents of which are incorporated herein by reference. The forked electrode support is made by encasing a preform electrode element in a plastic material 562 and thereafter removing a portion of the preform electrode element and the plastic to form the forked support 512, which has a first electrode arm 516 and a second electrode arm 517 defining a slot 514 therebetween. The electrode support 512 may include a temperature sensor 530 positioned in slot 514 and a plurality of leads 531 extending from the electrodes in the first and second electrode arms 516, 517 and a temperature lead 532 for the temperature sensor 530.

In this embodiment, the plastic material 562 is molded onto a reducing ring 565, preferably over-molded thereon. The connecting ring 565 includes a neck 566 and an annular seat 568. The connecting ring 565 may be a metal and/or an anti-biofouling material like those described above. Other probe heads may, like the conductivity head 112, have plastic housings or bodies over-molded onto a connecting ring.

The plastic material may be a suitable engineering thermoplastic material with good material strength that lends itself to having a window, slots, and/or annular grooves or other features of the sensor or probe head formed therein. The thermoplastic may be water, corrosion, and/or chemically resistant, and electrically insulating. The water-tight bond is important since the probe head is often used under water at significant depths and experiences increased pressure as it descends. If a gap occurs, water may be able to enter the probe head and damage its components.

The thermoplastic material may be an acetal, acrylic, acrylonitrile-butadiene-styrene terpolymer, a polyamide, a polycarbonate, a polyetherimide, a polyphenylene ether, a polyphenylene sulfide, a polysulfone, polyvinyl alcohol, or a thermoplastic polyester. In one embodiment, the thermoplastic material is an imide, preferably a non-filled imide such as a polyetherimide. Polyetherimides are commercially available under the brand name Ultem® available from SABIC Innovative Plastics.

Returning to FIG. 1, the circuit board 120 connects the sensor in the probe head 102 to the electrical connector 106. The circuit board 120 may include a plurality of components, such as memory, capacitors, analog to digital converters, and any other components that are needed to operate the sensor, collect data, store the data, and/or send the data to a device connected to electrical connector 106. In one embodiment, the circuit board 120 may include a pressure sensor 190. The pressure sensor 190 provides one means for detecting a leak or a break in the water-tight housing 119. This sensor may be used to test the probe during manufacturing after welding the housing to the other components or in the field to test the probe before, during, and/or after monitoring an environment.

The electrical connector 106, connected to the second end 131 of the circuit board 120, may be an electrical connector, preferably the electrical connector includes at least one male pin 122 and at least one female receptacle 124, and preferably the male pin and female receptacle are wet mateable connectors. In the embodiments of FIGS. 2A-4, the electrical connector 106 includes a wet mateable connector having two male pins 122 and two female receptacles 124. Electrical connector 106 includes a casing 126 surrounding at least part thereof, preferably the part adjacent to the second end 131 of the circuit board 120. The casing 126 provides a surface or surfaces for affixing the electrical connector 106 to the housing 119, preferably with a water-tight seal and may include an annular groove 128 at the opposite end for receiving a stop ring, similar to the stop ring 204 shown in FIG. 10. The casing 126 may be a metal and/or an anti-biofouling material such as those discussed above. In one embodiment, the casing 126 is the same material as the housing 119. The electrical connector 106 may also include electrical leads 129 coupling the electrical connector 106 to the circuit board 120. The leads 129 may be soldered to the circuit board 120 or may plug into a component on the circuit board 120, such as a female header, a card edge connector, a printed circuit board connector, a USB connector, or any other known or later-developed connector.

The housing 119 is a hollow, generally cylindrical tube having a distal end 132 defining a first open end 136 and a proximal end 134 defining a second open end 137. The inner diameter of the housing 119, overall, is larger that the circuit board 120 so that the housing 119 slides easily over the circuit board 120 with enough clearance to avoid bumping the circuit board 120 on the housing 119 and possibly damaging the circuit board 120 or one of its components. The housing 119 has a substantially uniform outer diameter; however, as best seen in FIG. 5, has a plurality of different inner diameters. The interior of the housing 119 has an annular lip 142 indented into the inner wall of the housing 119 just interior to the first open end 136, an enlarged opening 146 indented into the inner wall of the housing 119 just interior to the second open end 137, and a chamber 144 therebetween. The housing 119 may be a metal and/or an anti-biofouling material such as those discussed above.

The annular lip 142 has a larger inner diameter than the chamber 144 and extends generally uniformly into the interior of the housing 119 and is contiguous with the first open end 136. The annular lip 142 is proportional in width to the width of neck 103 of the probe head 102, so that the end of neck 103 seats on the annular lip 142 and the first open end 136 seats against the annular seat 116 of the probe head 102.

The enlarged opening 146 at the proximal end 134 of the housing 119 extends generally uniformly into the interior of the housing 119 and is contiguous with the second open end 137. The enlarged opening 146 has a larger inner diameter compared to the chamber 144 and may have a larger inner diameter compared to the annular lip 142. The enlarged opening 146 provides the advantage of receiving the reducing ring 148, which increases the surface area for connecting the housing 119 to the electrical connector 106, in particular to the casing 126 on the electrical connector 106. The increased surface area provides for a stronger bond, in particular, for a stronger weld joint between the components and an improved water-tight seal.

Figure 7:
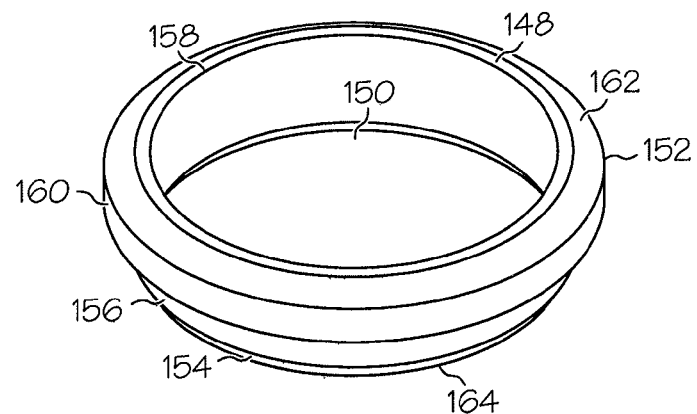
FIG. 7 is a front perspective view of the reducing ring of FIG. 1.
Figure 8:
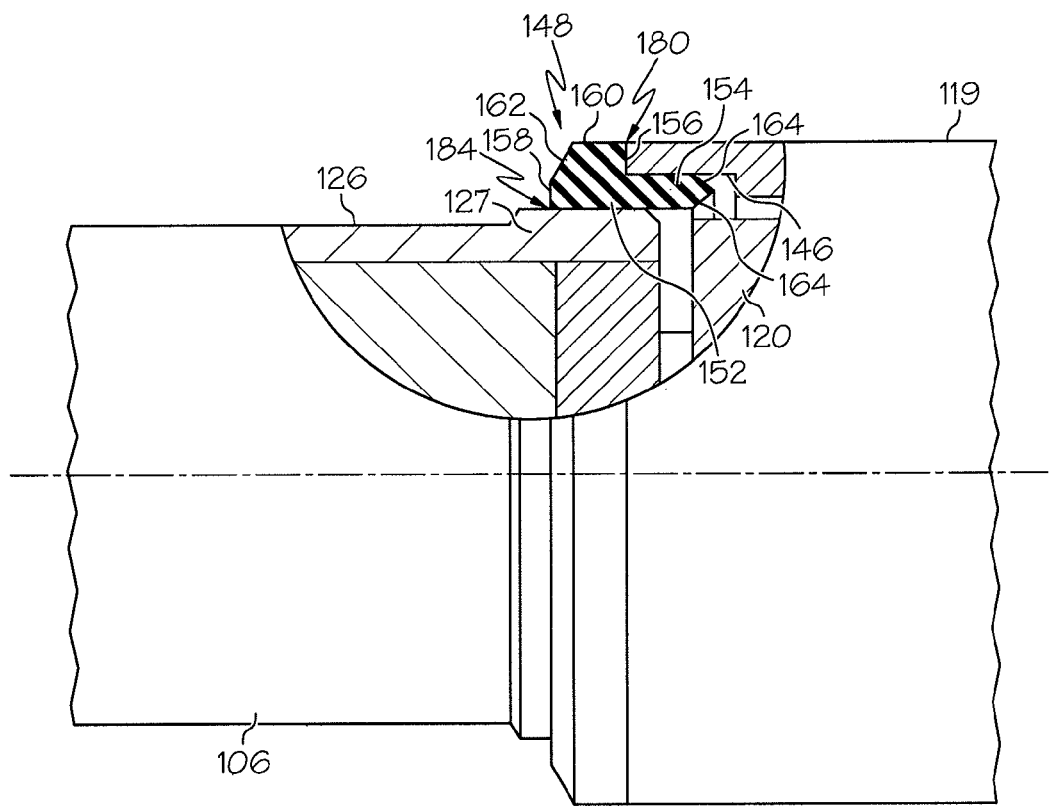
FIG. 8 is a partial cross-sectional view of the assembly of the connector to the proximal end of the housing.

Now referring to FIGS. 7-8, the reducing ring 148 has a central bore 150 therethrough and has a head 152 and a neck 154. The neck 154 has a smaller outer diameter compared to the head 152 and, as such, defines an eave 156 around the ring. The reducing ring 148, in particular the head 152, defines the top 158 of the reducing ring 148 and the neck 154 defines the bottom 164. The head 152 also defines an exterior surface of the ring, which includes a circumferential sidewall 160 and a shoulder 162 between the circumferential sidewall 160 and the top 158.

Figure 12:
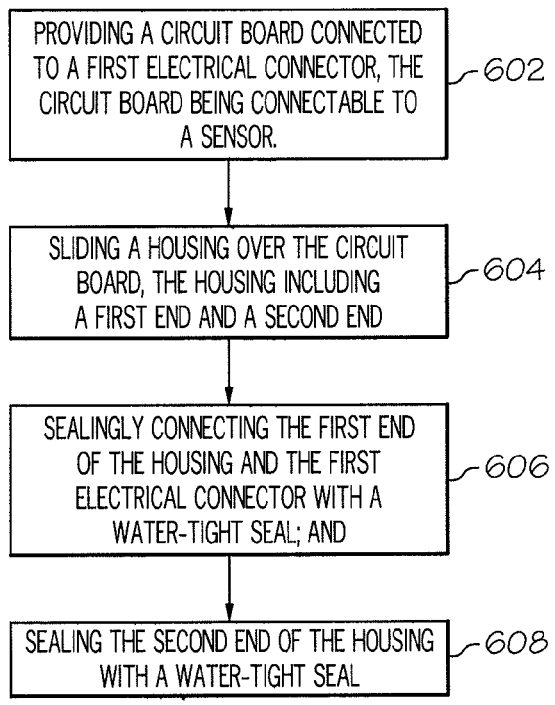
FIG. 12 is a diagram of one embodiment of a process to assembly the probe of FIG. 1.

The probe 100, like those in FIGS. 2A, 3, and 4, are assembled using the disclosed novel process of FIG. 12. The process includes the step 602 of providing a circuit board 120 or 120' connected to a first electrical connector 106. The circuit board 120 is connectable to a sensor. The process includes the step 604 of sliding a housing 119 or 219 over the circuit board 120 or 120', the step 606 of sealingly connecting the first end of the housing and the first electrical connector 106 with a water-tight seal, and the step 608 of sealing the second end of the housing with a water-tight seal.

The step 606 of sealingly connecting the first end of the housing and the first electrical connector may include welding the two components together. The welding may be by any known technique, preferably a technique that can form a water-tight seal between the components and will not damage any of the parts of the probe, in particular, the circuit board. The welding may be arc, MIG, TIG, laser, electron beam, resistance, ultrasonic, or plasma welding procedures. Some welding techniques may provide too much heat for the close proximity of the weld to the circuit board. Preferably, the welding is laser welding.

Laser welding is a non-contact process requiring access to the weld zone from only one side of the parts being welded. The weld is formed as the intense laser light rapidly heats the material, typically only taking milliseconds. One advantage that laser welding offers is the minimal amount of heat that is added during processing. This advantage makes laser welding ideal for thin sections or products that require welding near electronics. Low heat input, combined with an optical (not electrical) process, also means greater flexibility in tooling design and materials. Another advantage of laser welding is that filler material is generally not added.

Whether it is through part design, tooling design, or a combination of both, one factor for a successful laser weld is that components be held in intimate contact along the weld area. The ideal weld joint should have no gap between components. This is especially true in a lap weld joint configuration. Even the slightest space between parts can be the difference between a consistently strong weld, and no weld at all. Butt or seam weld joints are slightly more tolerant. Since laser welding is most often done without the benefit of filler metal, the material that forms the fillet must be "drawn" from the sections being welded.

In the embodiments of FIGS. 1-4, the sensor is housed within a probe head 102 that is connected to the circuit board 120, and the step 608 of sealing the second end 131 of the housing 119 with a water-tight seal includes sealingly connecting the second end 131 and the probe head 102 together, preferably using laser welding. The probe head 102 may include a neck 103 defining a annular seat 116 for the second end 131 of the housing 119, such that laser welding the two components together includes welding the second end 131 of the housing 119 to the neck 103 of the probe head 102.

In another embodiment, the process includes the step of providing a reducing ring 148 and sealingly connecting, preferably by laser welding, the reducing ring 148 to the open end 137 of the hollow housing 119. The step of sealingly connecting the reducing ring 148 to the housing 119 preferably occurs before the step of inserting the circuit board 120. Thereafter, the step of sealingly connecting the open end 137 includes welding, preferably by laser welding, the reducing ring 148 to the casing 126 of the electrical connector 106. The reducing ring 148 is designed to fill the gap between the enlarged opening 146 of the open end 137 of the housing 119 and the electrical connector 106 for a stronger weld. The reducing ring 148 also provides additional material to form the "fillet" of the weld.

In one embodiment, the housing 119 is slid over the circuit board 120 by sliding the distal end 132 over the electrical connector 106 and into engagement with the probe head 102. In another embodiment, the housing 119 is slid over the circuit board starting at the probe head 102.

Once the process is complete, a probe 100, for example, similar to those in FIGS. 2A, 3, and 4, is formed. The probe 100 includes a first weld 180 between the reducing ring 148 and the proximal end 134 of the housing 119, a second weld 182 between the neck 103 of the probe head 102 and the distal end 132 of the housing 119, and a third weld 184 between the reducing ring 148 and the casing 126 of the electrical connector 106. The first weld 180 and the second weld 182 may be more clearly seen in FIG. 8; wherein, the reducing ring 148 is shown inserted into the enlarged opening 146 with the neck 154 adjacent the inner surface of the enlarged opening 146 and with the eave 156 seated against the proximal end 134 of the housing 119. These surfaces provide a larger surface area, reduce the gap between components, and provide additional material for the placement of the first weld 180. Likewise, the central bore 150 of the reducing ring 148 lies adjacent the casing 126 of the electrical connector 106 to provide a larger surface area, reduces the gap between components, and provides additional material for the third weld 184. The end of the casing 126 may include a thickened portion or end 127 that is reinforced with additional material for an enhanced weld and/or to protect the electrical connector 106 underneath from exposure to the heat from the welding process.

The circuit board 120 is connected to the electrical connector 106, and the probe head 102 is preferably, and advantageously, an operable unit prior to being inserted into the housing 119. An operable unit includes the capability to operate the sensor, test the functions of the sensor and/or the circuit board, calibrate the sensor, and/or program the circuit board. Accordingly, the process may include the additional steps of testing the circuit board 120 to determine that the sensor is functioning and/or calibrating the sensor before inserting the circuit board 120 into the housing 119.

The process may also include the step of connecting the probe head 102 to the first end 130 of the circuit board 120, which may include soldering the leads 129 from the probe head 102 to the circuit board 120. In another embodiment, the step of connecting the probe head 102 may include plugging the probe head 102 into a connector on the first end 130 of the circuit board 120, such as those discussed above.

The process may also include the step of connecting the electrical connector 106 to the second end 131 of the circuit board 120. Like the probe head 102, the connecting of the electrical connector 106 may include soldering the leads 129 of the electrical connector 106 to the circuit board 120 or plugging the probe head 102 into a electrical connector 106 on the second end 131 of the circuit board 120, such as those discussed above.

Figure 13:
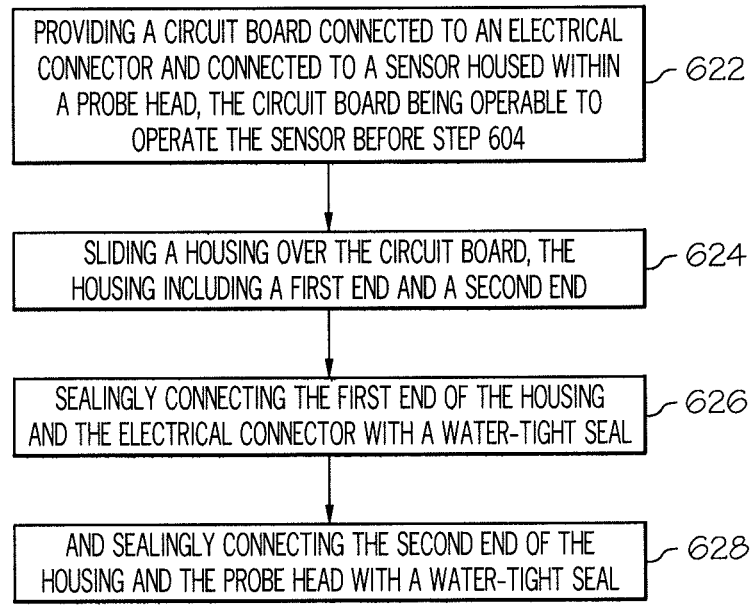
FIG. 13 is a diagram of one embodiment of a process to assembly the probe body of FIG. 9A.

Now referring to FIG. 13, the probe 100 may be assembled by a process that includes: (1) the step 622 of providing a circuit board connected to an electrical connector and connected to a sensor housed within a probe head; (2) the step 624 of sliding a housing having a first end and a second end over the circuit board; (3) the step 626 of sealingly connecting the first end of the housing and the electrical connector with a water-tight seal; and (4) the step 628 of sealingly connecting the second end of the housing and the probe head with a water-tight seal. The circuit board is operable to operate the sensor and is preferably operable before sliding the housing over the circuit board.

Figure 11:
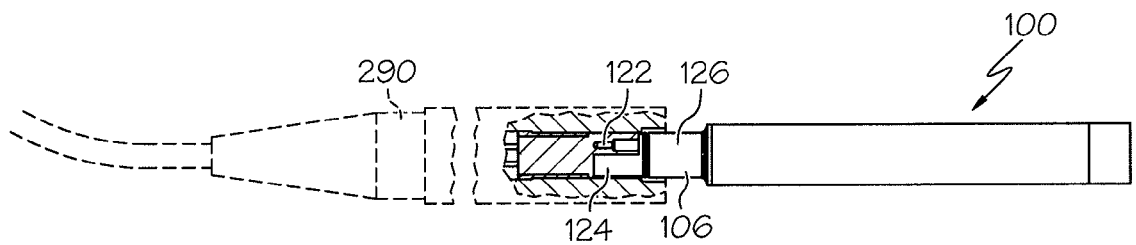
FIG. 11 is a side view with a partial cross-section of an assembled probe connected to a sensor adaptor.
Figure 14:
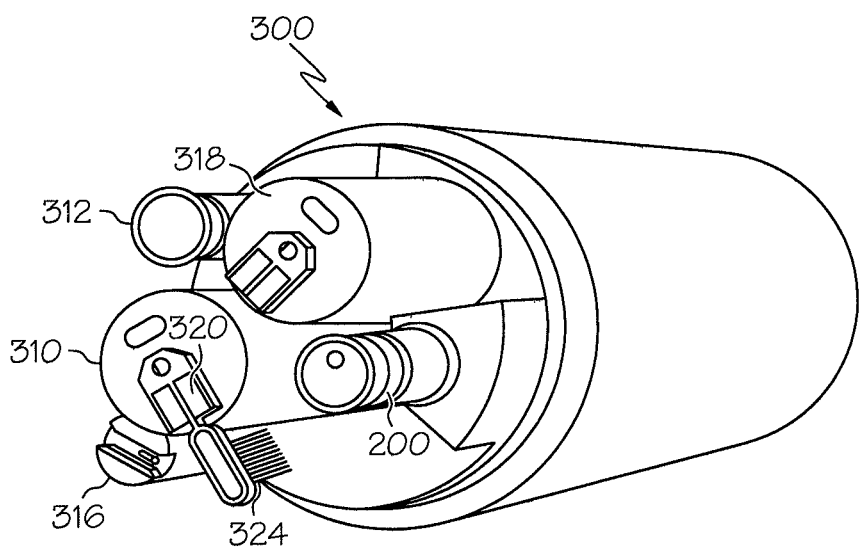
FIG. 14 is a top perspective view of a sonde that includes at least one of the disclosed probes.

When assembled, the probe 100 can monitor parameters of an environment, typically an environment surrounding the probe head 102, especially when connected to another device by electrical connector 106. In one embodiment, the probe 100 may be connected to a sonde 300 configured to receive the electrical connector 106 of a probe disclosed herein (FIG. 14). In another embodiment, the probe 100 may be connected to a sensor adaptor 290 (FIG. 11), a datalogger, a computer, a handheld monitoring unit, or any other device capable of connecting to the probe and communicating with the sensor therein to monitor the environment surrounding the sensor.

In another embodiment, the probe 100 may be mounted within a multi-probe assembly or sonde as illustrated in U.S. Pat. No. 6,779,383 and wiped with a wiper element that cleans, not only the disclosed probe 100, but other sensors in other probes.

Figure 9A:
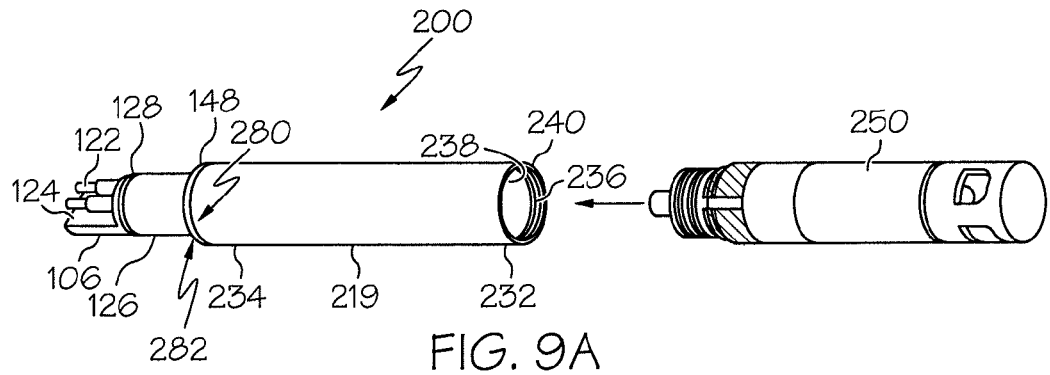
FIG. 9A is a side perspective view of one embodiment of a probe body configured to receive a replaceable probe head and the probe head.
Figure 9B:
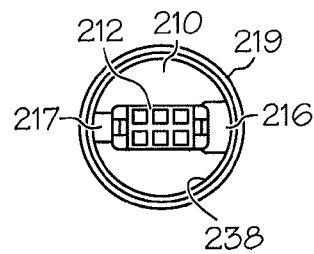
FIG. 9B is an end view of the probe body of FIG. 9A showing the circuit connector for connection that connects the probe body to a replaceable probe head.
Figure 10:
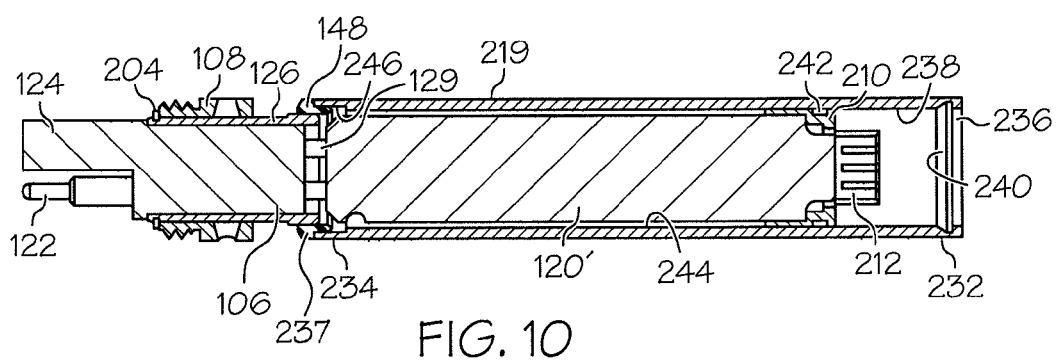
FIG. 10 is a cross-sectional view of the probe body of FIG. 9A.

Now referring to FIGS. 9A-10, a probe body 200 is disclosed that has a housing 219 that is preferably a hollow, generally cylindrical tube having a distal end 232 defining a opening 236 and a proximal end 234 defining a opening 237, a reducing ring 148, a first electrical connector 106 like those described above, a circuit board 120' housed within the housing 219 connected to the first electrical connector 106 and connected to a second electrical connector 212 at the end opposite the electrical connector 106. The housing 219 may be a metal and/or an anti-biofouling material such as those discussed above.

The housing 219 has a substantially uniform outer diameter, but has a plurality of different inner diameters. The inner diameter of the housing 219, overall, is larger than the circuit board 120' so that the housing 219 slides easily over the circuit board 120' with enough clearance to avoid bumping the circuit board 120' on the housing 219 and possibly damaging the circuit board 120' or one of its components. The interior of the housing 219, best seen in FIG. 10, has a cavity 238 at the distal end 232, an enlarged opening 246 at the proximal end 234, and a chamber 244 therebetween. Separating the cavity 238 from the chamber 244 may be an annular shoulder 242 for seating a platform 210 having the second electrical connector 212 therein or extending therefrom. The cavity 238 is generally sized to receive a replaceable probe head 250 (FIG. 9A), which is described in detail in Applicants' patent application Ser. No. 12/774,081 REPLACEABLE PROBE HEAD, filed the same day as this application, the entire contents of which are incorporated herein by reference. The cavity 238 includes, just interior to the opening 236, an annular groove 240 indented into the wall of the cavity and extending around its periphery. The annular groove 240 is shaped and positioned so as to receive a connecting means, for example, a snap fit feature, protruding from a coupling member of the replaceable probe head. It is appreciated that, while an annular groove is preferable, other means are possible.

The enlarged opening 246 at the proximal end 234 of the housing 219 extends generally uniformly into the interior of the housing 219 and is contiguous with the opening 237. The enlarged opening 246 has a larger inner diameter compared to the chamber 244 and may even have a larger inner diameter compared to the cavity 238. The enlarged opening 246 advantageously accepts the neck 154 of the reducing ring 148 to provide a larger surface area for welding the components together.

The circuit board 120' is mainly housed in chamber 244 and is connected to the platform 210 that has the second electrical connector 212. The platform 210, best seen in FIGS. 9B and 10, is seated on the annular shoulder 242, preferably the platform 210 is adhered thereto with a water-tight seal, for example with an epoxy adhesive, silicone RTV, potting compound, or any other suitable filler for forming a water tight seal. The platform 210 may also include a means to key the replaceable probe head 250 to the probe body 200; for example, first tab 216 and second tab 217 are different shapes so that there is only one orientation for the replaceable probe head 250 to be inserted into the cavity 238 and to connect to the second electrical connector 212. As explained in the REPLACEABLE PROBE HEAD patent application, alternate means of keying the replaceable probe head 250 to the probe body 200 are applicable.

The second electrical connector 212 may be an electrical connector, for example, a female header with either pins or sockets extending from the platform 210 away from the circuit board 120', a card edge connector, a printed circuit board connector, a USB connector, or any other known or later-developed connector that can connect the sensor in the replaceable probe head 250 to the circuit board 210' in the probe body 200. As shown in FIG. 9B, the second electrical connector 212 is a female header with six receptacles. However, one or more of the receptacles may be wired to the circuit board; for example, it is possible to have unused receptacles.

At the opposite end of the circuit board 120' from the platform 210, the circuit board 120' is connected to electrical connector 106 by leads 129. The electrical connector 106 may be an electrical connector, preferably the electrical connector includes at least one male pin 122 and at least one female receptacle 124, and preferably the male pin 122 and female receptacle 124 are wet mateable connectors. Electrical connector 106 may include a casing 126 surrounding at least part thereof, preferably the part adjacent to the proximal end 234 of the housing 219 to provide a surface for affixing the connector to the proximal end 234 with a water-tight seal. The casing 126 may be a metal and/or an anti-biofouling material such as those discussed above. In one embodiment, the housing 219 and the casing 126 are composed of the same material and may be fixedly attached to one another, for example, by laser welding. To enhance the attachment between the housing 219 and the casing 126, a reducing ring 148 may be inserted into the enlarged opening 246 of the housing 219 to provide increased surface area for the weld.

The electrical connector 106 may include a connecting collar 108 slideably received on the casing 126 for connecting the probe body 200 to a port in another device, for example, a sonde. The collar 108 may be a threaded collar. The electrical connector 106 may include a stop ring 204 in the annular groove 128 indented into the end of the casing 126 opposite the housing 219 that retains the collar 108 on the electrical connector 106.

The probes of FIGS. 9A-10 may be assembled according to the process of FIG. 12. A probe similar to those of FIGS. 9A-10 includes a sensor housed within a probe head 250 that is connectable to the circuit board 120', for example, a replaceable probe head 250. The circuit board 120' includes a second electrical connector 212 connected thereto that is connectable to the sensor within the probe head 250. Here, the step 608 of sealing the second end 232 of the housing includes sealingly connecting the second electrical connector 212 to the housing 219 with a water-tight seal, for example, by applying a sealant between the second electrical connector 212 and the housing 219. As described above, in one embodiment, the second electrical connector 212 is positioned within the housing 219 interior from the housing's second end 232. Electrical connector 212 may include a platform 210 surrounding it and the step of sealingly connecting the electrical connector 212 may include adhering the platform 210 within the housing 219, for example to an annular shoulder 242 with a water-tight seal.

In another embodiment, the process includes the step of providing a reducing ring 148 and laser welding the reducing ring 148 to the opening 237 of the housing 219. The step of laser welding the reducing ring 148 to the housing 219 preferably occurs before the step of inserting the circuit board 120'. Thereafter, the step of laser welding the opening 237 includes laser welding the reducing ring 148 to the casing of the electrical connector 106. The reducing ring 148, in this embodiment, provides the same advantages discussed above.

The process may also include the step of connecting the electrical connector 106 to the second end 232 of the circuit board 120', for example by soldering the leads 129 to the circuit board 120' or by plugging the leads 129 into a electrical connector 106 on the second end 232 of the circuit board 120', such as female header, a card edge connector, a printed circuit board connector, a USB connector, or any other known or later-developed connector.

Once probe body 200 is assembled, the probe body 200 includes a first weld 280 between the reducing ring 148 and the proximal end 234 of the housing 219 and a second weld 282 between the reducing ring 148 and the casing 126 of the electrical connector 106. FIG. 10 shows the reducing ring 148 inserted into the enlarged opening 246 with the neck 154 adjacent the inner surface of the enlarged opening and with the eave 156 seated against end of the housing 219 and the central bore 150 adjacent the casing 126 of the electrical connector 106.

The assembled probes disclosed herein, whether a probe like probe 100 or a probe body 200 with a replaceable probe head connected thereto, can monitor parameters of an environment, typically, an environment surrounding the probe head. The probe may be connected to another device by the electrical connector 106 for environmental and/or water monitoring applications, for example, a sonde 300 as shown in FIG. 14.

Referring to FIG. 14, in one embodiment, the probe 100 or the probe 200 having a replaceable probe head 102 may be connected to a sonde 300, like the sonde described in U.S. Pat. No. 6,779,383, modified to include the probes disclosed herein. The sonde 300 includes a plurality of probes having various sensing capabilities. For example, the sonde 300 may include a turbidity sensor 310, a dissolved oxygen sensor 312, the probe 200 having the replaceable probe head 102 that in one embodiment includes a pH electrode and/or an ORP electrode, a temperature-conductivity sensor 316 and a sensor 318, which can be a chlorophyll or rhomadine sensor. The sonde 300 may also include a wiper element 320 about which a wiper media such as a foamed rubber wiper pad is wrapped and extending therefrom beyond the diameter of the sensor. In one embodiment, the wiper is mounted on a turbidity sensor 310, for example. The wiper media may be a brush 324 for cleaning the surface of the sensors. In another embodiment, the probe 100 may be connected to a sensor adaptor 290, a datalogger, a computer, a handheld monitoring unit, or any other device capable of connecting to the probe and communicating with the sensor therein to monitor the environment surrounding the sensor. The environment surrounding the sensor may be, but is not limited to, air, a gas, a vapor, water, and/or an analyte.

Another advantage to both probe 100 and probe body 200 is that the housing 219 may be cut at one or more of the weld joints. The weld joints are located far enough from the circuit board 120' that such cuts do not damage the circuit board 120', and may be reassembled by re-welding. The removability of the housing 219 allows for repairs to the circuit board 120' or the replacement of a component of the circuit board 120' or the replacement of the electrical connector 106 or the probe head 102. Accordingly, a probe can be repaired rather than simply being discarded, which provides a cost savings to the manufacturer, as well as the user. Again, the welding is preferably laser welding.

It will be appreciated that while the invention has been described in detail and with reference to specific embodiments, numerous modifications and variations are possible without departing from the spirit and scope of the invention as defined by the following claims.

What is claimed is:

1. A process of assembling a probe, the process comprising:
   providing a circuit board connected to a first electrical connector, the circuit board being connectable to a sensor;
   providing a housing that includes a first end and a second end;

sliding the housing over the circuit board and at least part of the first electrical connector, wherein an end of the first electrical connector extends beyond the first end of the housing such that the first electrical connector is available for releasably coupling the probe to a mating electrical connector;

sealingly connecting the first end of the housing and the first electrical connector with a water-tight seal; and sealing the second end of the housing with a water-tight seal.

2. The process of claim 1 wherein sealingly connecting the first end to the first electrical connector includes laser welding them together.

3. The process of claim 1 wherein the first electrical connector is a wet-mateable connector.

4. The process of claim 1 wherein the sensor is housed within a probe head that is releasably connectable to the circuit board.

5. The process of claim 4 wherein the circuit board is connected to a second electrical connector, the second electrical connector being releasably connectable to the sensor within the probe head.

6. The process of claim 5 wherein sealing the second end of the housing includes sealingly connecting the second electrical connector to the housing with a water-tight seal.

7. The process of claim 6 wherein sealingly connecting the second electrical connector includes applying a sealant between the second electrical connector and the housing.

8. The process of claim 7 wherein the second electrical connector is positioned within the housing interior from the second end.

9. The process of claim 1 wherein the sensor is housed within a probe head, and the process further includes fixedly connecting the sensor to the circuit board.

10. The process of claim 9 wherein sealing the second end of the housing includes fixedly connecting the second end of the housing and the probe head to one another.

11. The process of claim 10 wherein fixedly connecting the second end to the probe head includes laser welding them together.

12. The process of claim 11 wherein the probe head includes a neck defining a seat for the second end of the housing, and the laser welding includes welding the second end of the housing and the neck of the probe head together.

13. The process of claim 9 wherein sliding the housing over the circuit board includes sliding the second end of the housing over the first electrical connector and into engagement with the probe head.

14. The process of claim 1 wherein the first electrical connector includes a casing, and sealingly connecting the first end of the housing to the first electrical connector includes connecting the first end of the housing to the casing.

15. A process of assembling a probe, the process comprising:

providing a circuit board connected to a first electrical connector, the circuit board being connectable to a sensor;

sliding a housing over the circuit board, the housing including a first end and a second end;

sealingly connecting the first end of the housing and the first electrical connector with a water-tight seal;

sealing the second end of the housing with a water-tight seal;

providing a reducing ring; and sealingly connecting the reducing ring to the first end of the housing before sealingly connecting the housing to the first electrical connector.

16. The process of claim 15 wherein sealingly connecting the reducing ring to the housing includes laser welding the reducing ring and the housing together, and sealingly connecting the housing to the first electrical connector includes laser welding the reducing ring of the housing and the first electrical connector together.

17. The process of claim 9 wherein the circuit board is operable to operate the sensor before sliding the housing thereover.

18. The process of claim 17 further comprising:

testing the sensor or calibrating the sensor before sliding the housing over the circuit board.

19. A process of assembling a probe, the process comprising:

providing a circuit board fixedly connected to an electrical connector and fixedly connected to a sensor housed within a probe head;

providing a housing having a first end and a second end;

sliding the housing over the circuit board and at least part of the electrical connector, wherein an end of the electrical connector extends beyond the first end of the housing such that the electrical connector is available for releasably coupling the probe to a mating electrical connector;

sealingly connecting the first end of the housing and the electrical connector with a water-tight seal; and sealingly connecting the second end of the housing and the probe head with a water-tight seal;

wherein the circuit board is operable to operate the sensor before sliding the housing thereover.

20. The process of claim 19 wherein the probe head includes a neck defining a seat for the second end of the housing, and sealingly connecting the second end of the housing to the probe head includes laser welding the second end of the housing and the neck of the probe head together.

21. A process of assembling a probe, the process comprising:

providing a circuit board connected to an electrical connector and connected to a sensor housed within a probe head;

sliding a housing over the circuit board, the housing including a first end and a second end;

sealingly connecting the first end of the housing and the electrical connector with a water-tight seal;

sealingly connecting the second end of the housing and the probe head with a water-tight seal;

wherein the circuit board is operable to operate the sensor before sliding the housing thereover;

providing a reducing ring; and sealingly connecting the reducing ring to the first end of the housing before sealingly connecting the housing to the first electrical connector.

22. The process of claim 21 wherein sealingly connecting the reducing ring to the housing includes laser welding the reducing ring and the housing together, and sealingly connecting the first end of the housing to the first electrical connector includes laser welding the reducing ring of the housing and the first electrical connector together.

23. The process of claim 22 wherein the first electrical connector includes a casing, and sealingly connecting the first end of the housing to the first electrical connector includes connecting the first end of the housing to the casing.

24. The process of claim 19 further comprising:

testing the sensor or calibrating the sensor before sliding the housing over the circuit board.

\* \* \* \* \*